US011739390B2

(12) United States Patent
Huang et al.

(10) Patent No.: US 11,739,390 B2
(45) Date of Patent: Aug. 29, 2023

(54) TANNING AGENT-FREE LEATHER MAKING METHOD

(71) Applicant: SICHUAN UNIVERSITY, Chengdu (CN)

(72) Inventors: Xin Huang, Chengdu (CN); Yawen Huang, Taixing (CN); Bi Shi, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/899,644

(22) Filed: Aug. 31, 2022

(65) Prior Publication Data

US 2022/0411887 A1 Dec. 29, 2022

Related U.S. Application Data

(63) Continuation of application No. PCT/CN2021/107531, filed on Jul. 21, 2021.

(30) Foreign Application Priority Data

Jun. 4, 2021 (CN) .......................... 202110624586.9

(51) Int. Cl.
*C14B 1/58* (2006.01)
*C14C 1/00* (2006.01)
*C14C 11/00* (2006.01)

(52) U.S. Cl.
CPC ............... *C14B 1/58* (2013.01); *C14C 1/00* (2013.01); *C14C 11/003* (2013.01)

(58) Field of Classification Search
CPC ............ C14B 1/58; C14C 1/00; C14C 11/003
See application file for complete search history.

(56) References Cited

U.S. PATENT DOCUMENTS 3,048,929 A * 8/1962 Kremen .................... C14B 1/24
8/94.1 R

FOREIGN PATENT DOCUMENTS

| CN | 104818354 | A |   | 8/2015  |           |
|----|-----------|---|---|---------|-----------|
| CN | 108014654 | A |   | 5/2018  |           |
| CN | 108842010 |   | * | 11/2018 | C14C 3/28 |
| CN | 108842010 | A |   | 11/2018 |           |
| CN | 109234476 |   | * | 1/2019  | C14C 1/00 |
| CN | 109234476 | A |   | 1/2019  |           |
| CN | 109234477 | A |   | 1/2019  |           |
| CN | 109385493 | A |   | 2/2019  |           |
| CN | 110218821 | A |   | 9/2019  |           |
| GB | 1093889   | A |   | 12/1967 |           |
| GB | 1587110   |   | * | 1/1981  | C14C 1/00 |
| JP | 2009286993| A |   | 12/2009 |           |

OTHER PUBLICATIONS

Qi Yao, et al., Hydroxyl-Terminated Dendrimer Acting as a High Exhaustion Agent for Chrome Tanning, ChemistrySelect, 2018, pp. 1032-1039, vol. 3.
Wei Ding, et al., Chrome-Reduced Combination Tanning for Cleaner Dyed Sheep Fur Processing, JALCA, 2015, pp. 363-371, vol. 110.
Yuling Tang, et al., Effect of Leather Chemicals on Cr(III) Removal from Post Tanning Wastewater, JALCA, 2018, pp. 74-80, vol. 113.
Yolanda S. Hedberg, et al., Chromium(III) and chromium(VI) release from leather during 8 months of simulated use, Contact Dermatitis, 2016, pp. 82-88, vol. 75.
Baohua Liu, et al., Preparation of Oxidized Poly (2-hydroxyethyl acrylate) with Multiple Aldehyde Groups by TEMPO-mediated Oxidation for Gelatin Crosslinking, JALCA, 2019, pp. 163-170, vol. 114.
Li Kailin, et al., Combination Tannage of Carboxyl Containing Aromatic Syntanand Aluminum Sulfate for Cattle Hide, Leather Science and Engineering, 2017, pp. 5-11, vol. 27, No. 3.
Shi Bi, et al., Chemical modifications of vegetable extracts and applications of the products in chrome-free and chrome-reduced tannages, China Leather, 2001, pp. 3-8, vol. 30, No. 9.
GB/T 39371-2020, Leather—Physical and mechanical tests—Determination of softness, 2020, pp. 1-2, State Administration for Market Regulation; Standardization Administration.
QB/T 1873-2010, Shoe upper leather, 2010, pp. 1-4, Ministry of Industry and Information Technology, of PRC.

* cited by examiner

*Primary Examiner* — Amina S Khan
(74) *Attorney, Agent, or Firm* — Bayramoglu Law Offices LLC

(57) ABSTRACT

A tanning agent-free leather making method is provided. A raw hide is subjected to controllable dehydration with a molecular sieve-polar organic solvent composite dehydration media to achieve a dehydrated hide, and then a tanning agent-free leather is prepared by increasing the surface roughness of the dehydrated hide and reducing the surface energy of the dehydrated hide. The present disclosure does not use any metal or non-metal tanning agent, which is eco-friendly. The present disclosure breaks the balance of water distribution between the raw hide and the polar organic solvent, which realizes a multi-medium self-driven directional controllable dehydration of the raw hide, effectively solving the problems during dehydration of the raw hide only using polar organic solvent. The molecular sieve-polar organic solvent dehydration system is easy to recover and can be recycled for the controllable dehydration of the raw hide multiple times. Therefore, a brand-new clean leather making technology is provided.

12 Claims, 6 Drawing Sheets

TANNING AGENT-FREE LEATHER MAKING METHOD

This application is a continuation application of the national phase entry of International Application No. PCT/CN2021/107531, filed on Jul. 21, 2021, which is based upon and claims priority to Chinese Patent Application No. 202110624586.9, filed on Jun. 4, 2021, the entire contents of which are incorporated herein by reference.

TECHNICAL FIELD

The present disclosure relates to the technical field of leather making, and in particular to a tanning agent-free leather making method.

BACKGROUND

Chrome tanning has always been the most commonly used method in the leather making (Yao Q, Chen H, Jiao Q, et al. Hydroxyl-Terminated Dendrimer Acting as a High Exhaustion Agent for Chrome Tanning[J]. *Chemistry Select*, 2018, 3 (4): 1032-1039. Ding W, Cheng Y, Wang Y, et al. Chrome-reduced Combination Tanning for Cleaner Dyed Sheep Fur Processing[J]. *Journal of the American Leather Chemists Association*, 2015, 110 (11): 363-371). However, during a chrome tanning process, a large amount of chromium salts, sulfates, and chlorides are needed. In addition, trivalent chromium Cr (III) has the risk of being oxidized into hexavalent chromium Cr (VI) during the post-tanning procedures such as neutralization, fatliquoring, and dyeing as well as the storage process (Tang Y, Zhou J, Zeng Y, et al. Effect of Leather Chemicals on Cr (III) Removal From Post Tanning Wastewater[J]. *Journal of the American Leather Chemists Association*, 2018, 113 (3). Hedberg Y S, Liden C. Chromium (III) and Chromium (VI) Release From Leather During 8 Months of Simulated Use[J]. *Contact Dermatitis*, 2016, 75 (2): 82-88), and the hexavalent chromium Cr (VI) is extremely harmful to the environment and human health. Therefore, it is necessary to develop an eco-friendly chrome-free tanning technology, so as to fundamentally eliminate the environmental risk of chrome tanning technology.

At present, a variety of chrome-free tanning agents have been developed for leather making, mainly including chrome-free metal tanning agents (such as titanium, zirconium, and aluminum tanning agents) and chrome-free non-metal tanning agents (such as vegetable tanning agents, aldehyde tanning agents, and synthetic tanning agents) (Liu B, Wei Z, Wang Y, et al. Preparation of Oxidized Poly (2-hydroxyethyl acrylate) with Multiple Aldehyde Groups by TEMPO-mediated Oxidation for Gelatin Crosslinking[J]. *Journal of the American Leather Chemists Association*, 2019, 114 (5): 163-170). However, the property of chrome-free leather prepared by any one of the above-mentioned tanning agents is significantly inferior to that of chrome-tanned leather. For example, zirconium-tanned leather is stiff and has poor softness, aluminum-tanned leather is not washable, and aldehyde-tanned leather is not suitable for long-term storage and is prone to yellowing (Li K, Liao X, Zhou J, et al. Experimental Study on Tanning of Yellow Cowhide with Combination of Carboxyl-containing Aromatic Synthetic Tanning agent and Aluminum Sulfate [J]. *Journal of Leather Science and Engineering*, 2017, 27 (3): 5-11. Shi B, Di Y, Song L, et al. Chemical Modification of Tanning Extract and Use of Product Thereof in Chrome-free or Chrome-less Tanning [J]. *China Leather*, 2001, 30 (9): 3-8). In summary, the cross-linking theory-based chrome-free tanning methods currently developed still cannot replace the traditional chrome tanning method. Moreover, the above-mentioned chrome-free tanning technology also leads to a large amount of tanning wastewater and causes pollution.

Compared with a raw hide, leather has a significantly reduced water content and significantly improved dispersion degree of collagen fibers. Therefore, the tanning agent-free leather making method, where a raw hide is dehydrated to reduce the water content and disperse the collagen fibers, has become a new development direction of chrome free leather making. Polar organic solvents have a dehydration effect. Thus, it is an important tanning agent-free leather making method to directly dehydrate a raw hide by polar organic solvent, and then conduct a hydrophobic treatment by increasing the surface roughness of the dehydrated hide and reducing the surface energy of the dehydrated hide (Huang X, He X, Shi B. Preparation Method of Chrome-free Leather with Hydrophobic and Highly-dispersed Hide Fiber Structures [P]. Sichuan Province: CN109234476A; and Shi B, He X, Zhou J, Wang Y, Zeng Y. Preparation Method of Dehydrated Hide [P]. Sichuan Province: CN109385493A). However, when a polar organic solvent is used to dehydrate a raw hide, the dehydration performance of the polar organic solvent is significantly reduced after the water in the raw hide is gradually removed and enters the polar organic solvent. With the progress of dehydration, the water distribution between the polar organic solvent and the raw hide reaches a balance, and it is necessary to replace the used polar organic solvent with a fresh polar organic solvent to further remove the water remaining in the raw hide. Therefore, the dehydration of a raw hide by using a polar organic solvent requires the multi-replacement of the polar organic solvent to achieve a prominent dehydration effect. In addition, a polar organic solvent used in dehydration has a high water content and cannot be reused for dehydration of a raw hide, which causes the problems of low solvent utilization and solvent emission. Furthermore, in the existing tanning agent-free leather making technology, the surface roughness of a dehydrated hide is enhanced through in-situ hydrolysis to achieve a hydrophobic treatment, and the accurate control of a degree of the in-situ hydrolysis is required, which is not conducive to industrial scale-up. At present, there is an urgent need to solve the above-mentioned bottleneck problems of tanning agent-free leather making.

SUMMARY

In order to solve the problems in the background, the present disclosure provides a tanning agent-free leather making method.

A tanning agent-free leather making method is provided, including subjecting a raw hide to controllable dehydration with molecular sieve-polar organic solvent composite dehydration media.

Further, the polar organic solvent includes, but is not limited to, any one or a mixture of anhydrous ethanol and acetone.

Further, the raw hide includes, but is not limited to, cowhide and sheepskin.

Further, a weight of the polar organic solvent used is 2.0 to 8.0 times a weight of the raw hide, and a weight of the molecular sieve used is 2.0 to 8.0 times the weight of the raw hide.

Further, the molecular sieve and the polar organic solvent are added in the order as follows: adding the molecular sieve and the polar organic solvent together to dehydrate the raw hide; or adding the polar organic solvent first to dehydrate the raw hide, and then adding the molecular sieve to reach a combined dehydration action.

Further, after subjecting the raw hide to controllable dehydration, the method further includes the following steps:

drying a dehydrated hide obtained after the controllable dehydration to obtain a crust;

subjecting the crust to a hydrophobic treatment; and drying a hide obtained after the hydrophobic treatment.

Further, a method of the hydrophobic treatment includes:

dispersing an oxide in a solvent to obtain a suspension, applying the suspension to a surface of the crust through suction filtration, drying the hide, and immersing the hide in a polydimethylsiloxane (PDMS) solution, where the oxide is any one selected from the group consisting of silicon dioxide, calcium oxide, aluminum oxide, zinc oxide, titanium dioxide, and magnesium oxide.

Further, a weight of the oxide is 8.0% to 20% of a weight of the crust; a weight of the solvent is 10 to 16 times the weight of the crust; and a weight of the PDMS is 5.0 to 12 times the weight of the crust.

Further, after subjecting the raw hide to controllable dehydration, the method further includes the following steps:

separating the molecular sieve from the polar organic solvent after the controllable dehydration;

subjecting the separated molecular sieve to a thermal treatment for activation; and compositing the molecular sieve activated by the thermal treatment with the separated polar organic solvent.

Further, a product obtained by compositing the molecular sieve activated by the thermal treatment with the separated polar organic solvent is reused for the controllable dehydration of a raw hide.

The molecular sieve used in the present disclosure is a porous material, which has excellent water adsorption capacity and stable properties and is easy to recycle. The molecular sieve used in the dehydration of the raw hide can selectively remove the water entering the polar organic solvent, such that the balance between the water remaining in the raw hide and the water entering the dehydration solvent is broken and the water remaining in the raw hide can be continuously removed and transferred to the polar organic solvent, which achieves a one-step controllable dehydration of water in the raw hide without solvent replacement, and solves the problem that the dehydration by using only polar organic solvent requires the multi-replacement of the solvent. Moreover, the molecular sieve is easily separated and recovered from the polar organic solvent after being used for dehydration, and the recovered molecular sieve can be activated by a thermal treatment and then reused together with the separated and recovered polar organic solvent for raw hide dehydration, thereby realizing the recycling of the polar organic solvent and the molecular sieve for the controllable dehydration of the raw hide. In addition, the method for improving the surface roughness of the dehydrated hide by applying the oxide to the surface of the dehydrated hide through suction filtration has the advantages of convenience, high efficiency, and easy industrial scale-up.

Compared with the prior art, the present disclosure has the following advantages:

The method provided by the present disclosure does not use any metal or non-metal tanning agent, which is eco-friendly.

The controllable dehydration leather making method provided by the present disclosure breaks the balance of water distribution between the raw hide and the polar organic solvent, and realizes a multi-medium self-driven directional controllable dehydration of the raw hide where the water moves from the raw hide to the polar organic solvent and further into the molecular sieve, promoting the continuous and controllable dehydration of water in the raw hide, and effectively solving the problems during dehydration of the raw hide using a single polar organic solvent, namely, the dehydration efficiency is low, and the polar organic solvent needs to be changed multiple times for dehydration and is difficult to be recycled.

In the method provided by the present disclosure, the used solvent does not require purification, and can be directly reused with the molecular sieve activated by a thermal treatment for tanning agent-free leather making, which not only significantly reduces the leather making cost, but also greatly improves the cleanliness of the leather making process and the eco-friendliness of the leather product.

The leather making method provided by the present disclosure does not require traditional leather making procedures such as tanning and retaining, instead, the leather making method involves a simple operation and a short leather making time, which remarkably improves the leather making efficiency.

The present disclosure will be described in detail below through the accompanying drawings and examples, and the technical solutions of the present disclosure are not limited to the specific implementations listed below. It should be noted that the examples are merely provided to further illustrate the present disclosure, rather than to limit the protection scope of the present disclosure. Some non-essential improvements and adjustments made to the present disclosure by technical engineers in the field according to the above contents of the present disclosure should be regarded as falling within the protection scope of the present disclosure.

Figure 13:
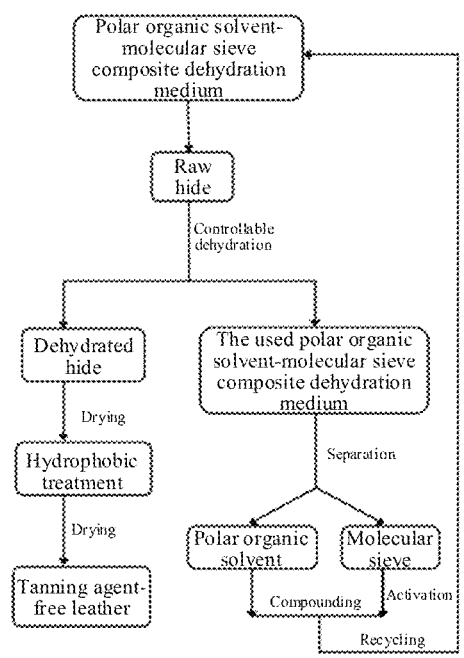
FIG. 13 shows a technical route of the present disclosure.

The technical route adopted by the present disclosure is shown in FIG. 13.

DETAILED DESCRIPTION OF THE EMBODIMENTS

Example 1

Tanning Agent-Free Leather Making

A raw hide (cowhide) was subjected to dehydration for 90 min in anhydrous ethanol (a weight of the anhydrous ethanol was 6.0 times a weight of the raw hide), then an activated molecular sieve powder (3A) (a weight of the activated molecular sieve powder was 3.5 times the weight of the raw hide) was added to allow further dehydration for 120 min to obtain a dehydrated hide, and a water content of the dehydrated hide was determined by the Karl Fischer method to be 2.95%.

The dehydrated hide was dried to obtain a crust, and the softness of the crust was determined to be 4.69 mm according to GB/T 39371-2020, as shown in Table 3.

Silicon dioxide (a weight of the silicon dioxide was 10% of a weight of the crust) was dispersed in anhydrous ethanol (a weight of the anhydrous ethanol was 10 times the weight of the crust) to obtain a suspension, then the suspension was applied to a surface of the crust through suction filtration, and then the hide was dried and soaked in a 10 wt % PDMS solution (a weight of the PDMS solution was 8.0 times the weight of the crust) for 5.0 min to complete a hydrophobic treatment.

Figure 1:
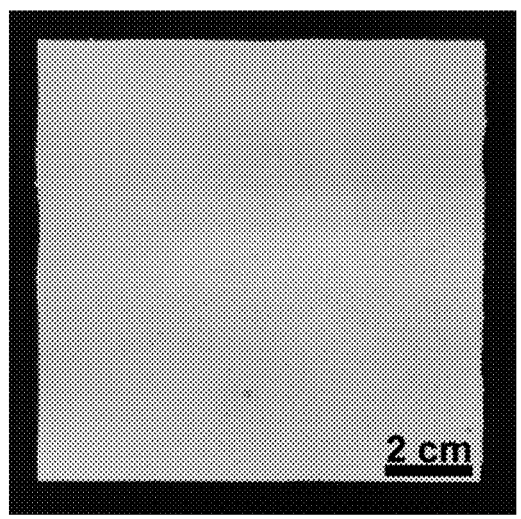
FIG. 1 is a picture of the tanning agent-free leather prepared in Example 1 of the present disclosure.

A hide obtained after the hydrophobic treatment was dried to obtain tanning agent-free leather. A picture of the tanning agent-free leather prepared in this example is shown in FIG. 1.

Recovery of the used molecular sieve and polar organic solvent:

A mixture of ethanol and the activated molecular sieve powder (3A) after being used for preparing the dehydrated hide in this example was subjected to separation to obtain a liquid at an upper layer and a solid at a lower layer, where the liquid was ethanol with a low water content of 0.97%, which could be directly reused for the tanning agent-free leather making of the present disclosure; and the solid was a 3A molecular sieve powder, which could be reused for the tanning agent-free leather making of the present disclosure after being activated at 300° C.

Figures 6A, 6B:
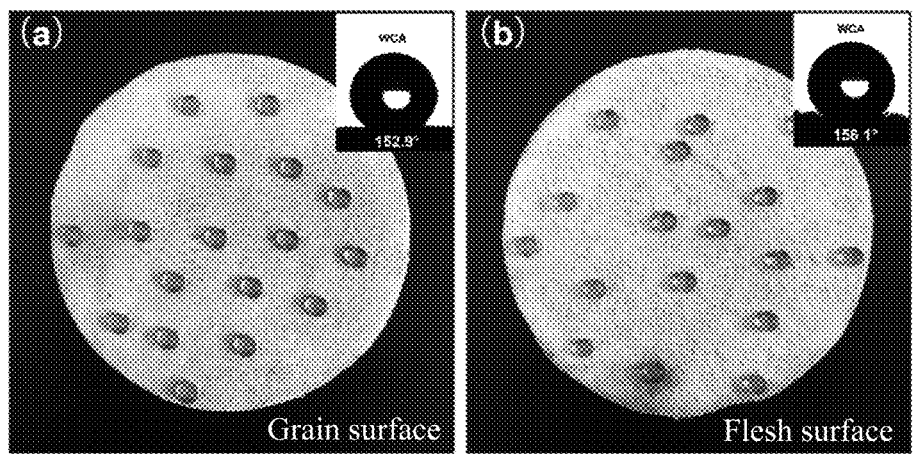
FIG. 6A shows a water contact angle of a grain surface of the tanning agent-free leather prepared in Example 1 of the present disclosure.
FIG. 6B shows a water contact angle of a flesh surface of the tanning agent-free leather prepared in Example 1 of the present disclosure.
Figure 10:
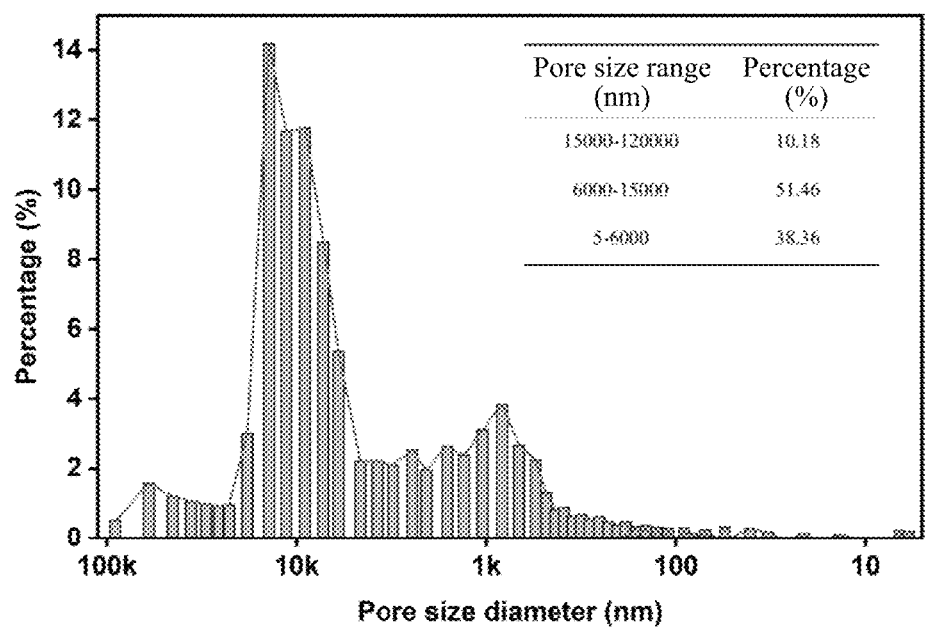
FIG. 10 shows a pore size distribution of the tanning agent-free leather prepared in Example 1 of the present disclosure.

A water contact angle of a grain surface of the tanning agent-free leather prepared in this example is shown in FIG. 6A, and a water contact angle of a flesh surface of the tanning agent-free leather is shown in FIG. 6B, both of which indicate a superhydrophobic effect. The pore structure parameters of the tanning agent-free leather are shown in Table 1. The mechanical performance parameters of the tanning agent-free leather are shown in Table 2. According to Table 1, the tanning agent-free leather prepared in this example has a porosity of 45.82±4.75%, an average pore size of 590.97±174.12 nm, and a total pore area of 4.28±1.11 $m^2/g$. According to the pore size distribution in FIG. 10, pore sizes of the tanning agent-free leather prepared in this example are mainly distributed in a range of 6,000 nm to 15,000 nm. According to Table 2, the tanning agent-free leather prepared in this example has a tear force of 179.77 N, a tensile strength of 28.50 $N/mm^2$, and an elongation at break of 36.10% at 10 $N/mm^2$. The above indexes all meet the requirements of QB/T 1873-2010.

Comparison with Comparative Example 1: The dehydrated hide prepared without the addition of a molecular sieve for dehydration in Comparative Example 1 has a water content of 9.56%. According to Table 3, the control sample prepared in Comparative Example 1 has a softness of 3.61 mm, which is stiff and has no potential for being used as leather.

TABLE 1

| Sample | Porosity (%) | Average pore size (nm) | Total pore area ($m^2/g$) |
|---|---|---|---|
| Example 1 | 45.82 ± 4.75 | 590.97 ± 174.12 | 4.28 ± 1.11 |
| Comparative Example 1 | 28.67 ± 1.54 | 599.91 ± 161.05 | 2.45 ± 0.86 |
| Comparative Example 2 | 17.10 ± 1.06 | 202.49 ± 33.23 | 2.64 ± 0.35 |

TABLE 2

| Sample | Tear force (N) | Tensile strength ($N/mm^2$) | Elongation at break (10 $N/mm^2$)/% |
|---|---|---|---|
| Example 1 | 179.77 | 28.50 | 36.10 |
| Example 2 | 156.12 | 31.80 | 25.70 |
| Example 3 | 152.16 | 30.44 | 16.60 |
| Example 5 | 160.62 | 24.21 | 32.40 |
| Example 13 | 162.69 | 27.69 | 17.44 |
| QB/T 1873-2010 | ≥30 | — | ≤40 |

TABLE 3

| Sample | Example 1 | Example 2 | Example 4 | Example 5 | Comparative Example 1 | Comparative Example 2 |
|---|---|---|---|---|---|---|
| Softness (mm) | 4.69 | 4.52 | 4.53 | 4.57 | 3.61 | 3.23 |

Example 2

The molecular sieve and ethanol recovered in Example 1 were reused as molecular sieve-polar organic solvent composite dehydration media for the tanning agent-free leather making in this example:

A raw hide (cowhide) was subjected to dehydration for 90 min in the recovered ethanol (a weight of the ethanol was 6.0 times a weight of the raw hide), then the recovered activated molecular sieve powder (3A) (a weight of the activated molecular sieve powder was 3.5 times the weight of the raw hide) was added to allow further dehydration for 120 min to obtain a dehydrated hide, and a water content of the dehydrated hide was determined by the Karl Fischer method to be 3.24%.

The dehydrated hide was dried to obtain a crust, and the softness of the crust was determined to be 4.52 mm, as shown in Table 3.

Silicon dioxide (a weight of the silicon dioxide was 10% of a weight of the crust) was weighed and dispersed in anhydrous ethanol (a weight of the anhydrous ethanol was 10 times the weight of the crust) to obtain a suspension, then the suspension was applied to a surface of the crust through suction filtration, and then the hide was dried and soaked in a 10 wt % PDMS solution (a weight of the PDMS solution was 8.0 times the weight of the crust) for 5.0 min to complete a hydrophobic treatment.

Figure 2:
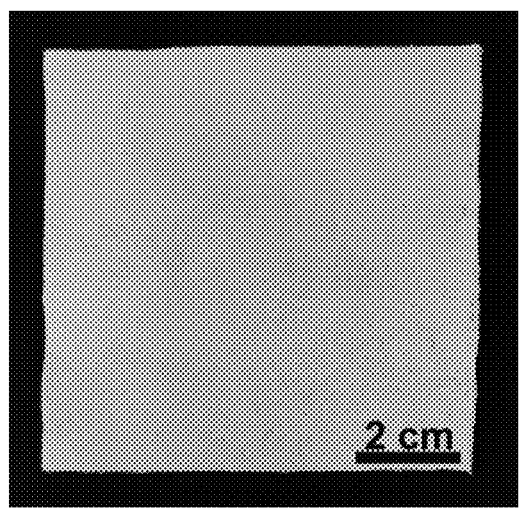
FIG. 2 is a picture of the tanning agent-free leather prepared in Example 2 of the present disclosure.

A hide obtained after the hydrophobic treatment was dried to obtain tanning agent-free leather. A picture of the tanning agent-free leather prepared in this example is shown in FIG. 2.

The mechanical performance parameters of the tanning agent-free leather prepared in this example are shown in Table 2. The tanning agent-free leather has a tear force of 156.12 N, a tensile strength of 31.80 N/mm$^2$, and an elongation at break of 25.70% at 10 N/mm$^2$. The above indexes all meet the requirements of QB/T 1873-2010.

Comparison with Example 1: The recovered ethanol and molecular sieve were reused for raw hide dehydration in this example, and the mechanical performance of the obtained tanning agent-free leather also met the requirements of QB/T 1873-2010, indicating that the molecular sieve-polar organic solvent composite dehydration media can be recovered and reused to prepare tanning agent-free leather, and the prepared tanning agent-free leather also has the service performance of leather.

Example 3

A raw hide (cowhide) was subjected to dehydration for 60 min in anhydrous ethanol (a weight of the anhydrous ethanol was 4.0 times a weight of the raw hide), then an activated molecular sieve powder (3A) (a weight of the activated molecular sieve powder was 2.0 times the weight of the raw hide) was added to allow further dehydration for 60 min to obtain a dehydrated hide, and a water content of the dehydrated hide was determined by the Karl Fischer method to be 3.48%.

The dehydrated hide was dried to obtain a crust.

Titanium dioxide (a weight of the titanium dioxide was 8.0% of a weight of the crust) was weighed and dispersed in anhydrous ethanol (a weight of the anhydrous ethanol was 12 times the weight of the crust) to obtain a suspension, then the suspension was applied to a surface of the crust through suction filtration, and then the hide was dried and soaked in a 10 wt % PDMS solution (a weight of the PDMS solution was 5.0 times the weight of the crust) for 30 min to complete a hydrophobic treatment. A hide obtained after the hydrophobic treatment was dried to obtain tanning agent-free leather. The mechanical performance parameters of the tanning agent-free leather prepared in this example are shown in Table 2. The tanning agent-free leather has a tear force of 152.16 N, a tensile strength of 30.44 N/mm$^2$, and an elongation at break of 16.60% at 10 N/mm$^2$. The above indexes all meet the requirements of QB/T 1873-2010.

Figures 7A, 7B:
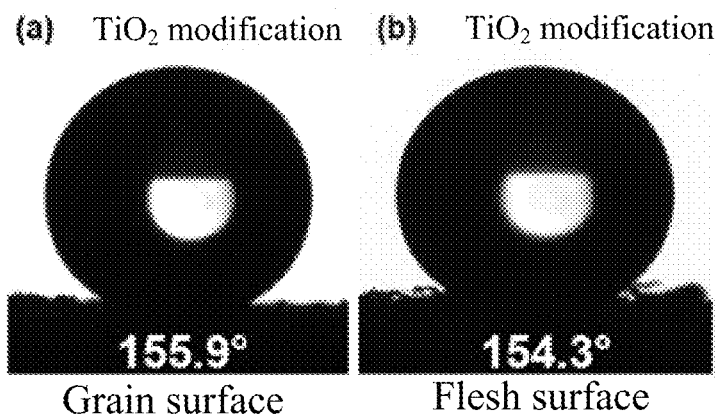
FIG. 7A shows a water contact angle of a grain surface of the tanning agent-free leather prepared in Example 3 of the present disclosure.
FIG. 7B shows a water contact angle of a flesh surface of the tanning agent-free leather prepared in Example 3 of the present disclosure.

A water contact angle of a grain surface of the tanning agent-free leather prepared in this example is shown in FIG. 7A, and a water contact angle of a flesh surface of the tanning agent-free leather is shown in FIG. 7B, both of which indicate a superhydrophobic effect.

Example 4

A raw hide (cowhide) was subjected to dehydration for 180 min in anhydrous ethanol (a weight of the anhydrous ethanol was 7.0 times a weight of the raw hide), then an activated molecular sieve powder (3A) (a weight of the activated molecular sieve powder was 5.0 times the weight of the raw hide) was added to allow further dehydration for 180 min to obtain a dehydrated hide, and a water content of the dehydrated hide was determined by the Karl Fischer method to be 2.78%.

The dehydrated hide was dried to obtain a crust, and the softness of the crust was determined to be 4.53 mm, as shown in Table 3.

Aluminum oxide (a weight of the aluminum oxide was 20% of a weight of the crust) was weighed and dispersed in anhydrous ethanol (a weight of the anhydrous ethanol was 15 times the weight of the crust) to obtain a suspension, then the suspension was applied to a surface of the crust through suction filtration, and then the hide was dried and soaked in a 10 wt % PDMS solution (a weight of the PDMS solution was 10 times the weight of the crust) for 60 min to complete a hydrophobic treatment.

A hide obtained after the hydrophobic treatment was dried to obtain tanning agent-free leather.

Figures 8A, 8B:
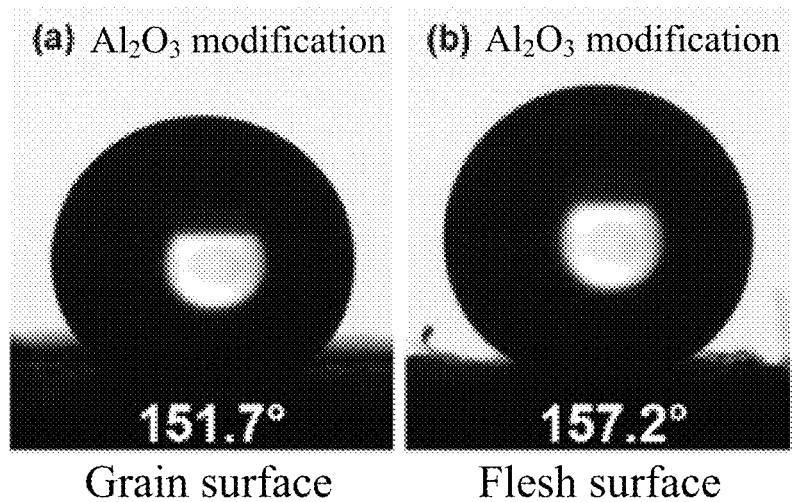
FIG. 8A shows a water contact angle of a grain surface of the tanning agent-free leather prepared in Example 4 of the present disclosure.
FIG. 8B shows a water contact angle of a flesh surface of the tanning agent-free leather prepared in Example 4 of the present disclosure.

A water contact angle of a grain surface of the tanning agent-free leather prepared in this example is shown in FIG. 8A, and a water contact angle of a flesh surface of the tanning agent-free leather is shown in FIG. 8B, both of which indicate a superhydrophobic effect.

Figure 5:
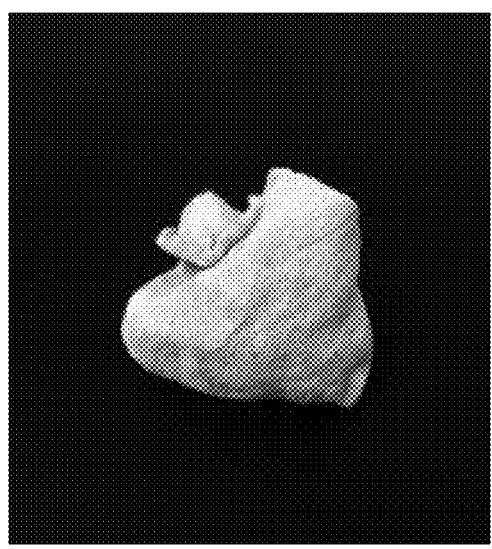
FIG. 5 is a picture of the control sample prepared in Comparative Example 3 of the present disclosure.

Comparison with Comparative Example 3: The activated molecular sieve powder (3A) was used at a weight only 5.0 times the weight of the raw hide in Comparative Example 3, and a picture of the prepared control sample is shown in FIG. 5. The control sample is stiff, curls into a lump and cannot be unfolded, and does not have the properties of leather.

Example 5

A raw hide (cowhide) was subjected to dehydration for 180 min in a mixture of molecular sieve particles (3A) (a weight of the molecular sieve particles was 4.0 times a weight of the raw hide) and anhydrous ethanol (a weight of the anhydrous ethanol was 8.0 times the weight of the raw hide) to obtain a dehydrated hide, and a water content of the dehydrated hide was determined by the Karl Fischer method to be 3.45%.

The dehydrated hide was dried to obtain a crust, and the softness of the crust was determined to be 4.57 mm, as shown in Table 3.

Calcium oxide (a weight of the calcium oxide was 15% of a weight of the crust) was weighed and dispersed in anhydrous ethanol (a weight of the anhydrous ethanol was 16 times the weight of the crust) to obtain a suspension, then the suspension was applied to a surface of the crust through suction filtration, and then the hide was dried and soaked in a 10 wt % PDMS solution (a weight of the PDMS solution was 6.0 times the weight of the crust) for 5.0 min to complete a hydrophobic treatment.

A hide obtained after the hydrophobic treatment was dried to obtain tanning agent-free leather.

Figures 9A, 9B:
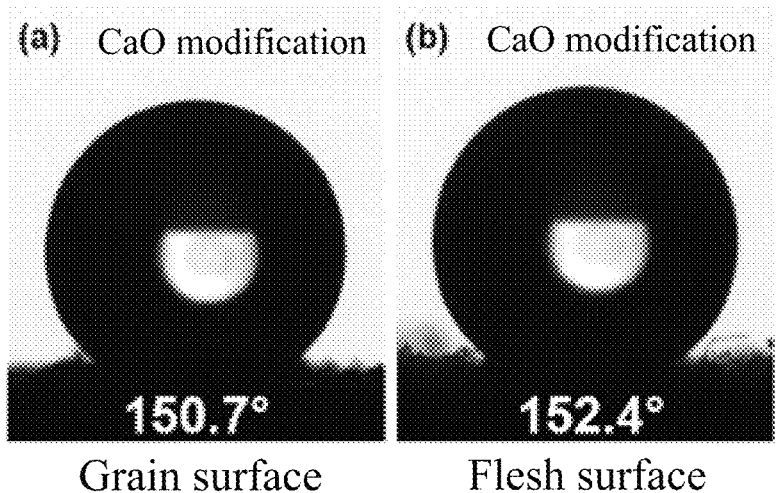
FIG. 9A shows a water contact angle of a grain surface of the tanning agent-free leather prepared in Example 5 of the present disclosure.
FIG. 9B shows a water contact angle of a flesh surface of the tanning agent-free leather prepared in Example 5 of the present disclosure.

A water contact angle of a grain surface of the tanning agent-free leather prepared in this example is shown in FIG. 9A, and a water contact angle of a flesh surface of the tanning agent-free leather is shown in FIG. 9B, both of which indicate a superhydrophobic effect. The mechanical performance parameters of the tanning agent-free leather prepared in this example are shown in Table 2. The tanning agent-free leather has a tear force of 160.62 N, a tensile strength of 24.21 N/mm$^2$, and an elongation at break of 32.40% at 10 N/mm$^2$. The above indexes all meet the requirements of QB/T 1873-2010.

Comparison with Comparative Example 4: The dehydrated hide obtained from dehydration first with the molecular sieve and then with anhydrous ethanol in Comparative Example 4 has a water content of 4.80%, which is similar to the water content of the dehydrated hide obtained in this example. However, the control sample prepared in Comparative Example 4 is stiff, curls into a lump and cannot be unfolded, and does not have the properties of leather.

Example 6

A raw hide (sheepskin) was subjected to dehydration for 90 min in anhydrous ethanol (a weight of the anhydrous ethanol was 6.0 times a weight of the raw hide), then an activated molecular sieve powder (3A) (a weight of the activated molecular sieve powder was 3.0 times the weight of the raw hide) was added to allow further dehydration for 80 min to obtain a dehydrated hide, and a water content of the dehydrated hide was determined by the Karl Fischer method to be 3.34%.

The dehydrated hide was dried to obtain a crust.

Magnesium oxide (a weight of the magnesium oxide was 13% of a weight of the crust) was weighed and dispersed in anhydrous ethanol (a weight of the anhydrous ethanol was 12 times the weight of the crust) to obtain a suspension, then the suspension was applied to a surface of the crust through suction filtration, and then the hide was dried and soaked in a 10 wt % PDMS solution (a weight of the PDMS solution was 10 times the weight of the crust) for 35 min to complete a hydrophobic treatment.

A hide obtained after the hydrophobic treatment was dried to obtain tanning agent-free leather.

Example 7

A raw hide (cowhide) was subjected to dehydration for 200 min in a mixture of molecular sieve particles (3A) (a weight of the molecular sieve particles was 3.0 times a weight of the raw hide) and anhydrous ethanol (a weight of the anhydrous ethanol was 7.0 times the weight of the raw hide) to obtain a dehydrated hide, and a water content of the dehydrated hide was determined by the Karl Fischer method to be 3.52%.

The dehydrated hide was dried to obtain a crust.

Zinc oxide (a weight of the zinc oxide was 16% of a weight of the crust) was weighed and dispersed in anhydrous ethanol (a weight of the anhydrous ethanol was 15 times the weight of the crust) to obtain a suspension, then the suspension was applied to a surface of the crust through suction filtration, and then the hide was dried and soaked in a 10 wt % PDMS solution (a weight of the PDMS solution was 6.0 times the weight of the crust) for 20 min to complete a hydrophobic treatment.

A hide obtained after the hydrophobic treatment was dried to obtain tanning agent-free leather.

Example 8

A raw hide (cowhide) was subjected to dehydration for 90 min in acetone (a weight of the acetone was 6.0 times a weight of the raw hide), then an activated molecular sieve powder (3A) (a weight of the activated molecular sieve powder was 3.5 times the weight of the raw hide) was added to allow further dehydration for 120 min to obtain a dehydrated hide, and a water content of the dehydrated hide was determined by the Karl Fischer method to be 2.57%.

The dehydrated hide was dried to obtain a crust.

Zinc oxide (a weight of the zinc oxide was 10% of a weight of the crust) was weighed and dispersed in acetone (a weight of the acetone was 13 times the weight of the crust) to obtain a suspension, then the suspension was applied to a surface of the crust through suction filtration, and then the hide was dried and soaked in a 10 wt % PDMS solution (a weight of the PDMS solution was 6.0 times the weight of the crust) for 25 min to complete a hydrophobic treatment.

Figure 3:
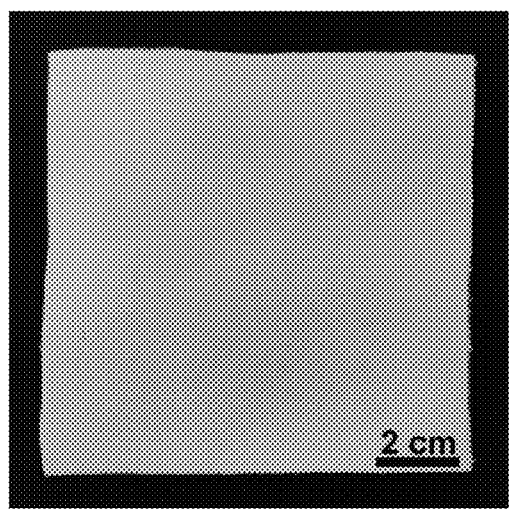
FIG. 3 is a picture of the tanning agent-free leather prepared in Example 8 of the present disclosure.

A hide obtained after the hydrophobic treatment was dried to obtain tanning agent-free leather. A picture of the tanning agent-free leather prepared in this example is shown in FIG. 3.

Example 9

A raw hide (sheepskin) was subjected to dehydration for 180 min in a mixture of acetone (a weight of the acetone was 7.0 times a weight of the raw hide) and molecular sieve particles (3A) (a weight of the molecular sieve particles was 3.0 times the weight of the raw hide) to obtain a dehydrated hide, and a water content of the dehydrated hide was determined by the Karl Fischer method to be 8.27%.

The dehydrated hide was dried to obtain a crust.

Silicon dioxide (a weight of the silicon dioxide was 8.0% of a weight of the crust) was weighed and dispersed in anhydrous ethanol (a weight of the anhydrous ethanol was 10 times the weight of the crust) to obtain a suspension, then the suspension was applied to a surface of the crust through suction filtration, and then the hide was dried and soaked in a 10 wt % PDMS solution (a weight of PDMS was 7.0 times the weight of the crust) for 25 min to complete a hydrophobic treatment.

A hide obtained after the hydrophobic treatment was dried to obtain tanning agent-free leather.

Example 10

A raw hide (sheepskin) was subjected to dehydration for 20 min in acetone (a weight of the acetone was 2.0 times a weight of the raw hide), then anhydrous ethanol (a weight of the anhydrous ethanol was 4.0 times the weight of the raw hide) was added to allow further dehydration for 40 min, then molecular sieve particles (3A) (a weight of the molecular sieve particles was 3.0 times the weight of the raw hide) were added to allow further dehydration for 100 min to obtain a dehydrated hide, and a water content of the dehydrated hide was determined by the Karl Fischer method to be 7.33%.

The dehydrated hide was dried to obtain a crust.

Calcium oxide (a weight of the calcium oxide was 13% of a weight of the crust) was weighed and dispersed in anhydrous ethanol (a weight of the anhydrous ethanol was 15 times the weight of the crust) to obtain a suspension, then the suspension was applied to a surface of the crust through suction filtration, and then the hide was dried and soaked in a 10 wt % PDMS solution (a weight of the PDMS solution was 10 times the weight of the crust) for 50 min to complete a hydrophobic treatment.

A hide obtained after the hydrophobic treatment was dried to obtain tanning agent-free leather.

Example 11

A raw hide (cowhide) was subjected to dehydration for 30 min in a mixture of anhydrous ethanol (a weight of the anhydrous ethanol was 3.0 times a weight of the raw hide) and acetone (a weight of the acetone was 3.0 times the weight of the raw hide), then an activated molecular sieve powder (3A) (a weight of the activated molecular sieve powder was 3.0 times the weight of the raw hide) was added to allow further dehydration for 120 min to obtain a dehydrated hide, and a water content of the dehydrated hide was determined by the Karl Fischer method to be 3.24%.

The dehydrated hide was dried to obtain a crust.

Calcium oxide (a weight of the calcium oxide was 15% of a weight of the crust) was weighed and dispersed in anhydrous ethanol (a weight of the anhydrous ethanol was 16 times the weight of the crust) to obtain a suspension, then the suspension was applied to a surface of the crust through suction filtration, and then the hide was dried and soaked in a 10 wt % PDMS solution (a weight of the PDMS solution was 12 times the weight of the crust) for 60 min to complete a hydrophobic treatment.

A hide obtained after the hydrophobic treatment was dried to obtain tanning agent-free leather.

Example 12

A raw hide (cowhide) was subjected to dehydration for 30 min in anhydrous ethanol (a weight of the anhydrous ethanol was 3.0 times a weight of the raw hide), then acetone (a weight of the acetone was 3.0 times the weight of the raw hide) and an activated molecular sieve powder (3A) (a weight of the activated molecular sieve powder was 3.0 times the weight of the raw hide) were added to allow further dehydration for 120 min to obtain a dehydrated hide, and a water content of the dehydrated hide was determined by the Karl Fischer method to be 3.76%.

The dehydrated hide was dried to obtain a crust.

Calcium oxide (a weight of the calcium oxide was 15% of a weight of the crust) was weighed and dispersed in anhydrous ethanol (a weight of the anhydrous ethanol was 16 times the weight of the crust) to obtain a suspension, then the suspension was applied to a surface of the crust through suction filtration, and then the hide was dried and soaked in a 10 wt % PDMS solution (a weight of the PDMS solution was 12 times the weight of the crust) for 60 min to complete a hydrophobic treatment.

A hide obtained after the hydrophobic treatment was dried to obtain tanning agent-free leather.

Example 13

A raw hide (cowhide) was subjected to dehydration for 60 min in anhydrous ethanol (a weight of the anhydrous ethanol was 2.0 times a weight of the raw hide), then an activated molecular sieve powder (3A) (a weight of the activated molecular sieve powder was 2.0 times the weight of the raw hide) was added to allow further dehydration for 60 min to obtain a dehydrated hide, and a water content of the dehydrated hide was determined by the Karl Fischer method to be 4.84%.

The dehydrated hide was dried to obtain a crust.

Titanium dioxide (a weight of the titanium dioxide was 8.0% of a weight of the crust) was weighed and dispersed in anhydrous ethanol (a weight of the anhydrous ethanol was 12 times the weight of the crust) to obtain a suspension, then the suspension was applied to a surface of the crust through suction filtration, and then the hide was dried and soaked in a 10 wt % PDMS solution (a weight of the PDMS solution was 5.0 times the weight of the crust) for 30 min to complete a hydrophobic treatment.

A hide obtained after the hydrophobic treatment was dried to obtain tanning agent-free leather. The mechanical performance parameters of the tanning agent-free leather prepared in this example are shown in Table 2. The tanning agent-free leather has a tear force of 162.69 N, a tensile strength of 27.69 $N/mm^2$, and an elongation at break of 17.44% at 10 $N/mm^2$.

Comparison with Example 3: The tanning agent-free leather prepared by dehydrating a raw hide with anhydrous ethanol at a weight 2.0 times a weight of the raw hide in this example exhibits similar mechanical performance to the tanning agent-free leather prepared in Example 3, and the above indexes all meet the requirements of QB/T 1873-2010.

Example 14

A raw hide (cowhide) was subjected to dehydration for 60 min in anhydrous ethanol (a weight of the anhydrous ethanol was 4.0 times a weight of the raw hide), then an activated molecular sieve powder (3A) (a weight of the activated molecular sieve powder was 8.0 times the weight of the raw hide) was added to allow further dehydration for 40 min to obtain a dehydrated hide, and a water content of the dehydrated hide was determined by the Karl Fischer method to be 4.16%.

The dehydrated hide was dried to obtain a crust.

Zinc oxide (a weight of the zinc oxide was 10% of a weight of the crust) was weighed and dispersed in anhydrous ethanol (a weight of the anhydrous ethanol was 13 times the weight of the crust) to obtain a suspension, then the suspension was applied to a surface of the crust through suction filtration, and then the hide was dried and soaked in a 10 wt % PDMS solution (a weight of the PDMS solution was 6.0 times the weight of the crust) for 25 min to complete a hydrophobic treatment.

A hide obtained after the hydrophobic treatment was dried to obtain tanning agent-free leather.

Comparative Example 1

A raw hide (cowhide) was subjected to dehydration for 210 min in anhydrous ethanol (a weight of the anhydrous ethanol was 6.0 times a weight of the raw hide) to obtain a dehydrated hide, and a water content of the dehydrated hide was determined by the Karl Fischer method to be 9.56%.

The dehydrated hide was dried to obtain a crust, and the softness of the crust was determined to be 3.61 mm, as shown in Table 3.

Magnesium oxide (a weight of the magnesium oxide was 5.0% of a weight of the crust) was weighed and dispersed in anhydrous ethanol (a weight of the anhydrous ethanol was 20 times the weight of the crust) to obtain a suspension, then the suspension was applied to a surface of the crust through suction filtration, and then the hide was dried and soaked in a 10 wt % PDMS solution (a weight of the PDMS solution was 20 times the weight of the crust) for 5.0 min to complete a hydrophobic treatment.

Figure 11:
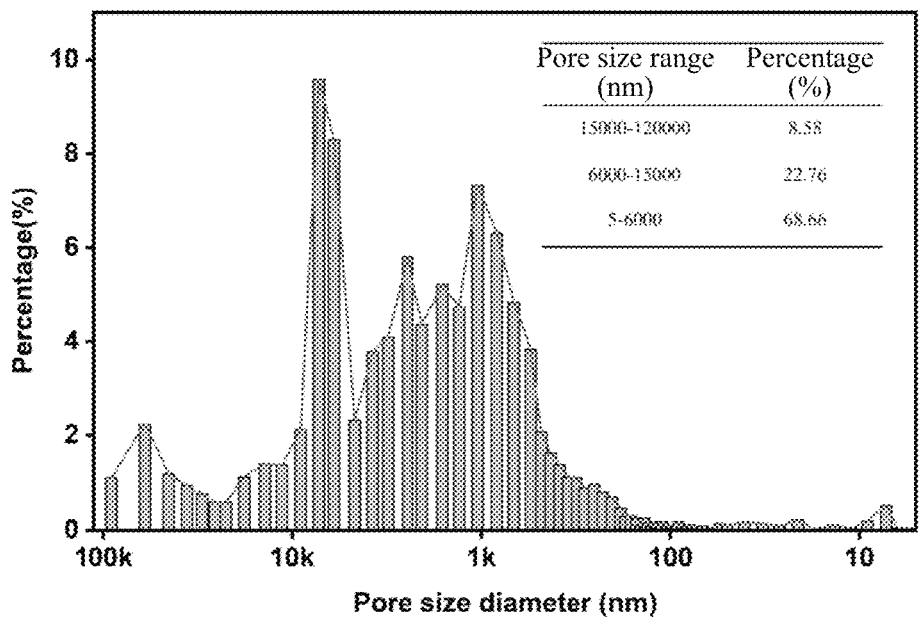
FIG. 11 shows a pore size distribution of the control sample prepared in Comparative Example 1 of the present disclosure.

A hide obtained after the hydrophobic treatment was dried to obtain a control sample. A pore size distribution of the control sample is shown in FIG. 11.

According to Table 1, the control sample prepared in this comparative example has a porosity of 28.67±1.54%, an average pore size of 599.91±161.05 nm, and a total pore area of 2.45±0.86 m²/g. Comparison with Example 1: The control sample has a low porosity and a pore size distribution mainly of 5.0 nm to 6,000 nm, which is caused by the adhesion of collagen fibers due to the high water content in the control sample.

Comparative Example 2

Figure 12:
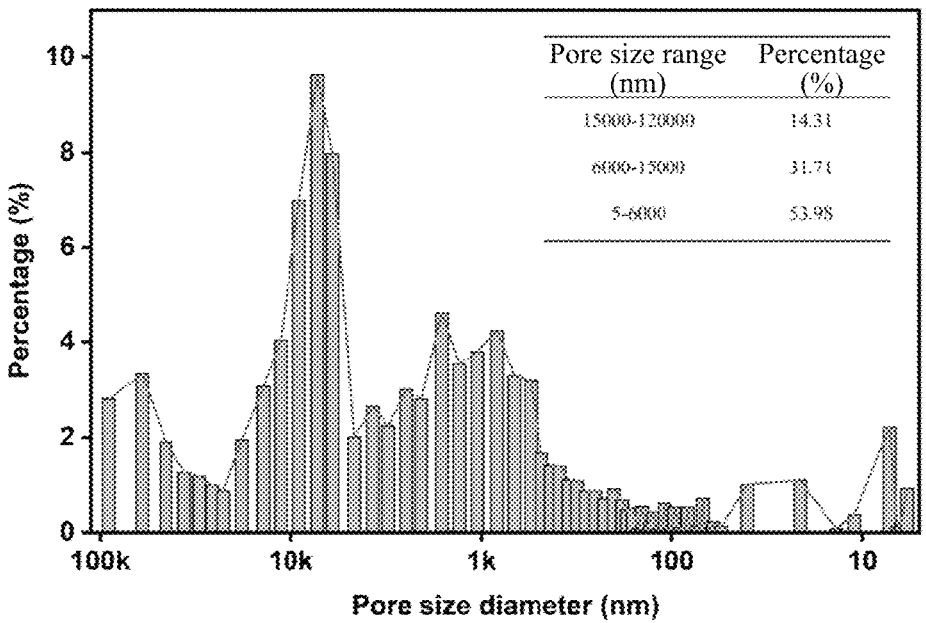
FIG. 12 shows a pore size distribution of the control sample prepared in Comparative Example 2 of the present disclosure.

A raw hide (cowhide) was toggled and dried to obtain a control sample. A pore size distribution of the control sample is shown in FIG. 12.

Figure 4:
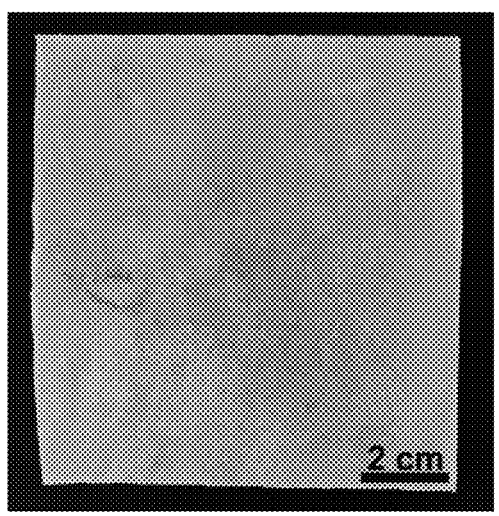
FIG. 4 is a picture of the control sample prepared in Comparative Example 2 of the present disclosure.

A picture of the control sample is shown in FIG. 4, and it can be seen that a surface of the control sample is yellowish-brown; the pore structure parameters of the control sample are shown in Table 1; and the softness of the control sample is shown in Table 3. According to Table 1 and Table 3, the control sample has a porosity of 17.10±1.06%, an average pore size of 202.49±33.23 m²/g, and a softness of 3.23 mm. The control sample is stiff and does not have the properties of leather.

Comparative Example 3

A raw hide (cowhide) was subjected to dehydration for 60 min in an activated molecular sieve powder (3A) (a weight of the activated molecular sieve powder was 5.0 times a weight of the raw hide) to obtain a control sample.

A picture of the control sample is shown in FIG. 5. The control sample is stiff, curls into a lump and cannot be unfolded, and does not have the properties of leather.

Comparative Example 4

A raw hide (cowhide) was subjected to dehydration for 90 min in molecular sieve particles (3A) (a weight of the molecular sieve particles was 4.0 times a weight of the raw hide), then anhydrous ethanol (a weight of the anhydrous ethanol was 8.0 times the weight of the raw hide) was added to allow further dehydration for 90 min to obtain a dehydrated hide, and a water content of the dehydrated hide was determined by the Karl Fischer method to be 4.80%.

The dehydrated hide was dried to obtain a control sample. The control sample is stiff, curls into a lump and cannot be unfolded, and does not have the properties of leather.

According to the results of the above examples and comparative examples, the tanning agent-free leather making technology provided by the present disclosure does not use any metal or non-metal tanning agent, and conducts a multi-medium self-driven directional controllable dehydration of a raw hide with molecular sieve-polar organic solvent composite dehydration media, which achieves a one-step controllable dehydration of water in the raw hide, and solves the problems that the dehydration using a single polar organic solvent requires the multi-replacement of the solvent and the organic solvent after being used for dehydration is not easily recycled. The molecular sieve-polar organic solvent composite dehydration media of the present disclosure can be separated, recovered, and reused for raw hide dehydration, and does not lead to organic wastewater, which significantly reduces the leather making cost and ensures the cleanliness of a leather making process and the eco-friendliness of a leather product.

Finally, it should be noted that the above examples are merely intended to describe the technical solutions of the present disclosure, rather than to limit the present disclosure. Although the present disclosure is described in detail with reference to the above examples, those of ordinary skill in the art should understand that modifications may be made to the technical solutions described in the above examples or equivalent replacements may be made to some or all technical features thereof; and such modifications or replacements do not make the essence of a corresponding technical solution depart from the scope of the technical solutions in the examples of the present disclosure.

What is claimed is:

1. A tanning agent-free leather making method, comprising a step of subjecting a raw hide to a controllable dehydration with molecular sieve-polar organic solvent composite dehydration media.

2. The tanning agent-free leather making method according to claim 1, wherein a polar organic solvent of the molecular sieve-polar organic solvent composite dehydration media comprises any one or a mixture of anhydrous ethanol and acetone.

3. The tanning agent-free leather making method according to claim 1, wherein the raw hide comprises cowhide and sheepskin.

4. The tanning agent-free leather making method according to claim 1, wherein a weight of a polar organic solvent of the molecular sieve-polar organic solvent composite dehydration media is 2.0 to 8.0 times a weight of the raw hide, and a weight of a molecular sieve of the molecular sieve-polar organic solvent composite dehydration media is 2.0 to 8.0 times the weight of the raw hide.

5. The tanning agent-free leather making method according to claim 1, wherein a molecular sieve and a polar organic solvent of the molecular sieve-polar organic solvent composite dehydration media are added in an order as follows: adding the molecular sieve and the polar organic solvent together to dehydrate the raw hide; or adding the polar organic solvent first to dehydrate the raw hide and then adding the molecular sieve to reach a combined dehydration action.

6. The tanning agent-free leather making method according to claim 1, wherein after the step of subjecting the raw hide to the controllable dehydration, the tanning agent-free leather making method further comprises the following steps: drying a dehydrated hide obtained after the controllable dehydration to obtain a crust; subjecting the crust to a hydrophobic treatment; and drying a hide obtained after the hydrophobic treatment.

7. The tanning agent-free leather making method according to claim 6, wherein a method of the hydrophobic treatment comprises: dispersing an oxide in a solvent to obtain a suspension, applying the suspension to a surface of the crust through a suction filtration, drying a hide applied with the suspension to obtain a treated hide, and immersing the treated hide in a polydimethylsiloxane (PDMS) solution, wherein the oxide is any one selected from the group consisting of silicon dioxide, calcium oxide, aluminum oxide, zinc oxide, titanium dioxide, and magnesium oxide.

8. The tanning agent-free leather making method according to claim 7, wherein a weight of the oxide is 8.0% to 20% of a weight of the crust; a weight of the solvent is 10 to 16 times the weight of the crust; and a weight of the PDMS solution is 5.0 to 12 times the weight of the crust.

9. The tanning agent-free leather making method according to claim 1, wherein after the step of subjecting the raw hide to the controllable dehydration, the method further comprises the following steps: separating a molecular sieve of the molecular sieve-polar organic solvent composite dehydration media from a polar organic solvent of the molecular sieve-polar organic solvent composite dehydration media after the controllable dehydration to obtain a separated molecular sieve and a separated polar organic solvent; subjecting the separated molecular sieve to a thermal treatment for an activation; and compositing the molecular sieve activated by the thermal treatment with the separated polar organic solvent.

10. The tanning agent-free leather making method according to claim 9, wherein a product obtained by compositing the molecular sieve activated by the thermal treatment with the separated polar organic solvent is reused for the step of subjecting the raw hide to the controllable dehydration.

11. The tanning agent-free leather making method according to claim 2, wherein a weight of the polar organic solvent of the molecular sieve-polar organic solvent composite dehydration media is 2.0 to 8.0 times a weight of the raw hide, and a weight of a molecular sieve of the molecular sieve-polar organic solvent composite dehydration media is 2.0 to 8.0 times the weight of the raw hide.

12. The tanning agent-free leather making method according to claim 3, wherein a weight of a polar organic solvent of the molecular sieve-polar organic solvent composite dehydration media is 2.0 to 8.0 times a weight of the raw hide, and a weight of a molecular sieve of the molecular sieve-polar organic solvent composite dehydration media is 2.0 to 8.0 times the weight of the raw hide.

* * * * *